United States Patent [19]

Fiebig

[11] 4,075,776
[45] Feb. 28, 1978

[54] JIGGING POLE

[76] Inventor: Robert J. Fiebig, 1818 Fremont, NW., Grand Rapids, Mich. 49504

[21] Appl. No.: 690,957

[22] Filed: May 28, 1976

[51] Int. Cl.² ............................................. A01K 87/00
[52] U.S. Cl. ...................... 43/24; 43/18 R; 43/23
[58] Field of Search ............... 43/17, 18 R, 186 F, 43/20, 23, 19, 19.2, 21.2, 24

[56] References Cited

U.S. PATENT DOCUMENTS

| D. 147,462 | 9/1947 | Leivo | 43/18 R X |
| D. 200,781 | 4/1965 | Magnus | D22/23 |
| 1,843,714 | 2/1932 | Fuller | 43/18 R |
| 2,239,227 | 4/1941 | Gunnufson | 43/20 |
| 2,632,273 | 3/1953 | Fletcher | 43/18 R |
| 2,759,288 | 8/1956 | Bratek | 43/18 R |
| 3,034,246 | 5/1962 | Davidson | 43/17 |
| 3,034,247 | 5/1962 | Lunsman | 43/17 |

OTHER PUBLICATIONS

Louis Johnson Co., "Lujig," Highland Park, Ill., 3/3/1958.

Primary Examiner—Louis G. Mancene
Assistant Examiner—Peter K. Skiff
Attorney, Agent, or Firm—Price, Heneveld, Huizenga & Cooper

[57] ABSTRACT

The jigging pole of the present invention includes a tapered and curved, stiffly resilient rod shank having a handle at one end and integral line guide defined by an aperture formed at an angle of approximately 45° through the opposite tip end. The rod shank is preformed with the tip end curved such that the fishing line extends vertically downward when the pole handle is held in an approximately horizontal position. Such construction provides a compact jigging pole which readily transmits the forces applied to the fishing line to the fisherman to provide a better feel of the line as well as improved jigging action utilizing the handle.

2 Claims, 3 Drawing Figures

JIGGING POLE

BACKGROUND OF THE INVENTION

The present invention relates to fishing equipment and in particular to an improved jigging pole.

In northern climates, ice fishing is becoming increasingly popular as is a technique known as jigging whereupon a relatively short fishing pole is employed for fishing at relatively shallow depths. If a school of fish is located below a hole in the ice formed by the fisherman, the fish can be relatively quickly withdrawn thus permitting the rapid catching of several fish from the school.

Jigging poles of known construction are straight and usually formed of a relatively flexible rod, usually of fiberglass construction. Such construction does not easily permit the rapid recovery of fish due to the undesirable bending of the pole nor does it provide the desired line force transmission to the fisherman due to the higher resiliency of the pole employed. Although straight, relatively flat and tapered fishing rod shanks have been suggested as represented by design patent U.S. Pat. No. Des. 200,781 issued Apr. 6, 1965 to F. H. Magnus, the unique construction of Applicant's invention is not suggested by such prior art.

SUMMARY OF THE INVENTION

The jigging pole of the present invention overcomes the deficiencies of the prior art by providing a stiffly resilient rod shank having a curved tip end such that forces applied to the fishing line attached to the rod shank are transmitted to the wrist of the fisherman to provide a better feel for the biting of fish as well as permitting the relatively rapid removal of fish from the water, an important feature in jigging. In the preferred embodiment an aperture is integrally formed at an angle through the tip to define an eyelet for guiding the line vertically downwardly when the pole is held in a generally horizontal position at the handle end remote from the tip end.

These and other features, advantages and objects of the present invention will become apparent upon reading the following description thereof in conjunction with the drawings in which:

DETAILED DESCRIPTION OF THE PREFERRED EMBODIMENT

Figure 1:
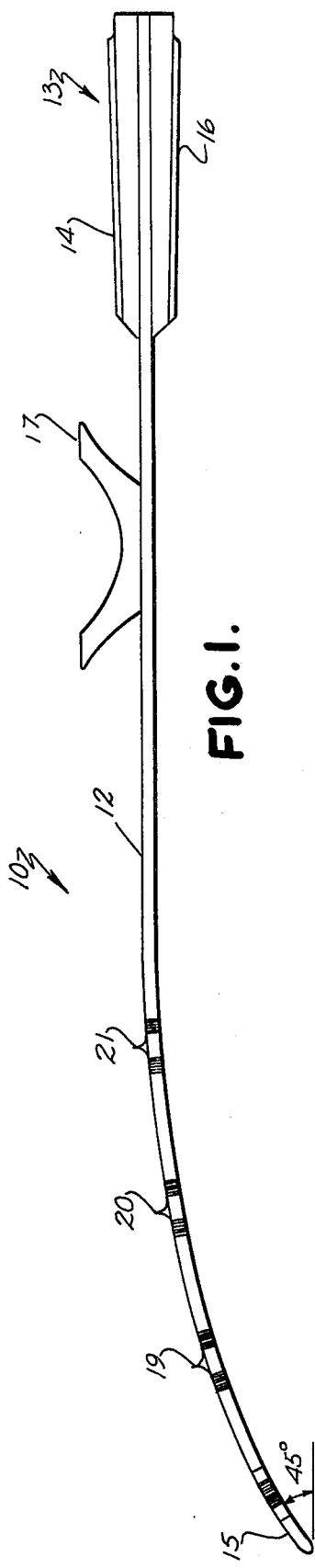
FIG. 1 is a side elevational view of a jigging pole constructed according to the preferred embodiment of the invention.
Figure 2:
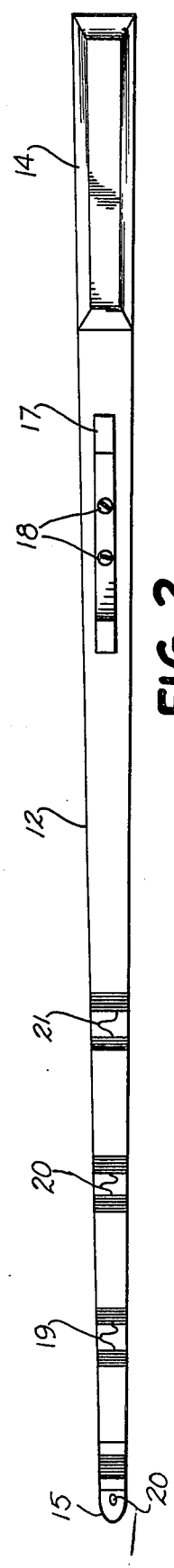
FIG. 2 is a top plan view of the pole shown in FIG. 1.

Referring now to the drawings, there is shown a jigging pole 10 having a rod shank 12 terminating at one end in a handle means 13 comprising an upper gripping member 14 and a lower gripping member 16. Members 14 and 16 sandwich the wide end of the tapered rod shank 12 between the gripping members which are secured to the rod shank by means of suitable bonding adhesive such as epoxy cement. The rod shank 12 is formed of flat stock, tapered inwardly from the handle end to the tip end. The flat stock has a generally rectangular cross section. In the preferred embodiment the rod shank was made of hickory wood approximately ¼ inch thick and which initially is a straight piece 28 inches long having a width at the handle end 13 of ⅝ of an inch and at the tip end 15 of ⅜ of an inch.

The rod shank 12 is then pre-formed in the permanently curved configurations as seen in FIG. 1 by steaming the hickory shank and stressing it in a suitable jig to the desired configuration. It is seen that the rod shank is smoothly curved from about its center to the tip such that the tip end 15 forms an angle to the horizontal of approximately 45° as shown in FIG. 1.

Figure 3:
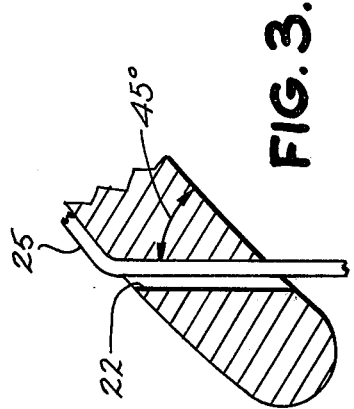
FIG. 3 is an enlarged, fragmentary cross-sectional view of the tip end of the pole showing the fishing line extending through the integrally formed eyelet.

Attached to the rod shank near the handle is a line holding cleat 17 of conventional form and secured to the shank by means of fastening screws or rivets 18 together with suitable epoxy cement. Also attached to the rod shank are three spaced eyelets 19, 20 and 21 of conventional construction and secured to the shaft by means of line wraps in a conventional manner as shown. At the tip end of the jigging pole 10 there is provided an integral aperture 22 defining an eyelet as best seen in FIG. 3 and which is formed through the tip 15 of shaft 12 at an angle of approximately 45°. When the handle means 13 is held horizontally, the combined 45° bend of the shank 12 and the 45° eyelet 22 permit the fishing line 25 to drop vertically downwardly through a hole in the ice.

The gripping members 14 and 16 in the preferred embodiment were formed of cherry wood suitably configurated to be comfortable in the hand of the user. In the preferred embodiment, the gripping members overlay the shank and were co-extensive with the shank. The members had a length of approximately 6 inches and a width at their bases equal to the rod shank 12. The gripping members 14 and 16 also are tapered to be narrowed from their base and their outer surface.

With the jigging pole formed of a stiffly resilient material such as hickory, forces applied to the fishing line 25 by the nibbling of the fish on bait are directly transmitted to the fisherman's wrist through the relatively large, rectangular shank 12 such that the fisherman can quickly respond to a nibble. Also due to the relatively stiff pole, the fish can be rapidly pulled through a hole in the ice.

Typically when jigging with a pole such as described herein, the water depth below the ice preferably ranges from 1 to 16 feet, and a variety of baits such as Russian hooks, spoons with hooks, or the like can be employed. The fishing line normally used is between 10 and 15 pound test monofilament line. The wooden jigging pole of the preferred embodiment is protected by polyurethane finish. Such construction provides the user with a relatively easily used pole which is compact due in part to its curved tip and which can provide a 6 to 12 inch jigging motion by simply providing a slight amount of wrist action to the gripping members 14 and 16. This naturally tends to attract the fish.

In the pole constructed according to the preferred embodiment, it was discovered that the hickory wood so formed provided a stiffly resilient pole in which the tip end 15 is deflected through approximately 1½ inches with a pull of about 1½ pounds. Although hickory wood configurated as shown in the preferred embodiment provides the optimum action believed to be desired for jigging, it will become apparent to those skilled in the art that modifications to the pole to provide the desired fishing action and yet a relatively compact and easily used jigging pole can be used. Such modifications may, for example, provide a shank made of different materials or having cross sections different than the flat, tapered hickory wood stock employed in the present invention. It is important, however, that the pole be stiffly resilient and be curved to provide the desired feel for the fisherman. These and other modifications to the preferred embodiment of the invention as described and disclosed herein can be made by those skilled in the art without departing from the spirit and scope of the invention as defined by the appended claims.

The embodiments of the invention in which an exclusive property or privilege is claimed are defined as follows:

1. A jigging pole for fishing comprising:
    a curved, stiffly resilient wooden rod shank of rectangular cross section and having handle means at one end and an integral line guiding eyelet formed through said shank at the opposite tip end; said shank being curved only at the tip half of the shank such that said tip end is oriented at an acute angle to the horizontal; said integral line guiding eyelet comprises an aperture formed through said rod shank at an angle to the longitudinal axis of said shank which is generally complementary to said acute angle such that line extending through said aperture will depend vertically from said rod shank when said handle means is horizontally disposed;
    line guiding means located on top of said shank whereby fishing line is supported on said solid upper surface of said shank; and
    wherein said handle means comprises a pair of gripping members overlaying said rod shank on opposite sides at said one end and co-extensive with a portion of said rod shank.
2. The apparatus as defined in claim 1 wherein said rod shank has a constant thickness along its length.

* * * * *